United States Patent
Marinzet (12) 
(10) Patent No.: US 6,652,741 B1
(45) Date of Patent: Nov. 25, 2003

(54) PISTON PUMP, METHOD AND INSTALLATION FOR FILTERING WATER

(76) Inventor: Bernard Marinzet, Chemin Saint-Joseph, 84400 Rustrel (FR)

( * ) Notice: Subject to any disclaimer, the term of this patent is extended or adjusted under 35 U.S.C. 154(b) by 0 days.

(21) Appl. No.: 10/009,017

(22) PCT Filed: Jun. 14, 2000

(86) PCT No.: PCT/FR00/01642

§ 371 (c)(1),
(2), (4) Date: Dec. 4, 2001

(87) PCT Pub. No.: WO00/77397

PCT Pub. Date: Dec. 21, 2000

(30) Foreign Application Priority Data

Jun. 15, 1999 (FR) .......................................... 99 07795

(51) Int. Cl.$^7$ ............................................... F04B 35/00
(52) U.S. Cl. ...................... 210/101; 210/650; 210/134; 417/404; 417/534; 417/313
(58) Field of Search .............................. 210/650, 97, 98, 210/101, 134, 321.65, 634, 637, 644, 649, 117, 257.2, 652; 417/390, 323, 264, 404, 403, 401, 26, 53, 54, 213, 216; 137/485

(56) References Cited

U.S. PATENT DOCUMENTS

| 3,707,881 A | 1/1973 | Neuhaus et al. ............... 91/306 |
| 3,825,122 A | 7/1974 | Taylor ......................... 210/134 |
| 4,432,876 A | 2/1984 | Keefer ......................... 210/652 |
| 4,913,809 A | 4/1990 | Sawada et al. ............... 210/98 |
| 4,929,347 A | 5/1990 | Imai et al. ................... 210/101 |
| 6,017,200 A | * | 1/2000 | Childs et al. ............... 417/404 |

FOREIGN PATENT DOCUMENTS

| DE | 2249683 | 4/1974 |
| FR | 1396282 | 7/1965 |
| FR | 2595121 | 9/1987 |
| FR | 2689421 | 10/1993 |
| WO | 9811979 | 3/1998 |

* cited by examiner

Primary Examiner—W. L. Walker
Assistant Examiner—K S Menon
(74) Attorney, Agent, or Firm—Ladas & Parry (57) ABSTRACT

The present invention provides a method and an installation for filtering a liquid using a membrane filter device. The technical sector of the invention is the field of manufacturing filter devices, in particular semipermeable membrane devices. In the invention, a pump (3, 4) for pressurizing a liquid has three pistons (24, 25, 26) connected to a common shaft (23) mounted to move in translation in three chambers (18a, 18b; 19a, 19b; 20a, 20b) that are in alignment; two of said pistons (24, 26) being identical and connected to the ends of the shaft (23), each separating one of the chambers (18, 20) into two cavities (18a, 18b, 20a, 20b).

25 Claims, 7 Drawing Sheets

PISTON PUMP, METHOD AND INSTALLATION FOR FILTERING WATER

The present invention relates to a method and an installation for filtering a liquid by using a membrane filter device.

The technical field of the invention is that of making semipermeable membrane filter devices.

The present invention relates more particularly to a method and apparatus for desalinating sea water or brine by reverse osmosis, and to methods and apparatuses for ultra-filtration of a liquid such as water, e.g. to produce water that is suitable for drinking or for irrigation.

A drawback of installations for filtering sea water in order to desalinate it is low efficiency: the energy consumed to obtain 1 cubic meter ($m^3$) of desalinated water is about 5 kilowatt hours (kWh) to 10 kWh. In order to recover energy from the resulting supersalinated water, a turbine, such as a "Pelton" type turbine can be used, but given that the efficiency of a turbine is low, the overall efficiency of the installation is improved only a little. Furthermore, such installations fitted with centrifugal pumps and turbines are expensive, and their reliability and longevity are relatively poor.

In installations for desalinating sea water by reverse osmosis, the water to be treated is delivered to the inlet of a filter device at an inlet pressure which is greater than the osmotic pressure of water. As a general rule, the pressure with which water is fed to the inlet of the filter is not less than 25 bars, e.g. it lies in the range about 30 bars to 100 bars, and in particular in the range about 60 bars to 80 bars. The filter delivers both a concentrate of "supersalinated" water and a permeate of desalinated water (at a pressure which is close to atmospheric pressure). The pressure of the concentrate leaving the filter is generally at a pressure which is only slightly less than the feed pressure of water for desalination, e.g. it may be at a pressure which is lower by about 1 bar to 5 bars, given that the pressure drop in the filter is small.

In less powerful filter installations, in particular in nano-filtration installations for treating brine, the filter is fed with water to be treated at a pressure of about 10 bars and a concentrate is recovered at a pressure of about 4 bars to 8 bars.

U.S. Pat. No. 3,825,122 describes pumping apparatus for filtering a fluid by reverse osmosis, which apparatus comprises a plurality of cylinders in alignment defining a main fluid pumping chamber, a booster chamber for recovering energy from the concentrate, and a hydraulic chamber for actuating the apparatus by means of hydraulic fluid pressurized by a pump. Each chamber is provided with a piston that moves in reciprocating translation under the action of a piston rod which is common to all of the pistons. Although the object stated in that document is to maintain a constant flow rate of pressurized fluid, the system for reversing the travel direction of the rod by using end-of-stroke sensors controlling distributor valves placed on ducts connected to the chambers does not enable a continuous flow rate to be ensured. That is probably why that apparatus, like all other piston pumps systems, has not enjoyed effective industrial development for filtering by reverse osmosis. Filter membranes are extremely sensitive to variations in pressure and flow rate which cause them to become clogged or to break.

U.S. Pat. No. 4,432,876 describes various apparatus seeking to reduce fluctuations in water pressure and flow rate at the outlet from a pump: a device for simultaneously varying the volume of the pump chamber and the volume of an expansion chamber coupled to the pump chamber; two variants of the apparatus, one with a controlled valve and the other with two piloted check valves mounted head to tail, cause those two chambers to be put momentarily into communication while the piston is at the end of its stroke so as to clip pressure surges due to sudden opening and closing of valves located on the water ducts. That document also proposes apparatus comprising three or more pistons, driven by one or more common crank shafts, and it recommends avoiding machines having two, four, eight, or 16 pistons. In order to make the apparatus described in U.S. Pat. No. 4,432,876 more compact, and to eliminate the devices for varying chamber volume, U.S. Pat. No. 4,913,809 describes pumping apparatus having two pistons interconnected by a rod and driven by a double-acting hydraulic actuator, with the pressure controlling the position of a distributor valve provided on the water ducts being delivered with a small offset in time.

In spite of those improvements provided to piston pumps, it can be seen that present-day reverse osmosis installations essentially comprise low efficiency centrifugal pumps, since piston pump apparatuses are too complex and unsuitable for pressurizing water for delivery to membrane filters.

An object of the present invention is to provide a liquid-filtering method and installation that are improved.

An object of the present invention is to improve the overall efficiency of such filter methods and installations.

In a first aspect, the invention consists in proposing water pumping apparatus comprising at least two pumps, each pump comprising:

- at least two chambers in alignment on a longitudinal axis;
- at least two pistons respectively mounted to move in reciprocating translation in each of the two chambers; and
- a transmission shaft for transmitting forces between the two pistons, which shaft extends in part in each of the chambers and is mounted to slide relative thereto along said longitudinal axis;

the pumping apparatus further comprising an actuator suitable for delivering the energy required for compressing the water, minus the energy recovered from the concentrate by said pistons, by causing the shaft to move—usually periodically—in reciprocating translation (sliding) together with the pistons in each of the pumps, and means for causing the shaft and the pistons of each pump to pause for a prolonged period at the end of each stroke, i.e. twice for each period of the periodic cycle, thus making it possible to avoid or greatly limit any variations in the pressure of the water at the inlet to the filter(s).

The pumping apparatus furthermore comprises means for accelerating one of said two pumps while another one of said two pumps is pausing for a prolonged period at the end of its stroke, thereby enabling the accumulated flow rate of water delivered by the pumps to the filter(s) to be maintained at a value which is substantially constant.

In the meaning of the present invention, the term "pause" means a duration during which at least one of said pistons, and in general both pistons of a pump together with the associated shaft, are substantially stationary; the duration of said pause is such that its ratio to the period of the cycle of the shaft (and of the pistons) is generally greater than $10^{-3}$; this ratio can rise to very high values, e.g. about 0.1 or more, in particular when said two pumps do not both have the same capacity; under such circumstances, the pause of the larger capacity pump will be of duration longer than the pause of the smaller capacity pump.

Nevertheless, in general, both pumps will have the same capacity and each will be controlled in such a manner as to perform end-of-stroke pauses of durations that are substantially identical for both pumps.

In order to control the slowing down followed by the pause at the end of a stroke, at least one of the chambers of at least one of the pumps is preferably fitted with a sensor for sensing the position of the piston (and/or the shaft) and positioned in such a manner as to issue a detection signal before said piston (and/or said shaft) reaches its end-of-stroke position; this detection signal is transmitted to an electronic control. unit which responds to receiving said signal by causing the energy delivered by said actuator of the pump in question to be stopped.

The driving energy supplied by said actuator is preferably transmitted to the water via a driving hydraulic fluid acting on a "drive" piston connected to said shaft in a manner similar to that described in the above-mentioned patents. The pause in the delivery of driving fluid under pressure to the drive piston then causes the pause of the pump in question.

In another aspect, the invention consists in providing a water pumping apparatus comprising two pumps, each pump having two chambers in alignment, each receiving a piston movable in translation within the chamber, the two pistons being interconnected by a sliding shaft, said apparatus further comprising a double-acting hydraulic actuator for driving each pump and a loop for circulating a pressurized driving hydraulic fluid, which loop is single and consequently common to all of said hydraulic actuators of the pumping apparatus; the apparatus further comprises means for selectively putting each actuator into communication with said loop, which means are controlled in such a manner that the sum of the driving hydraulic fluid flow rate delivered to the actuators is substantially constant over time, such that the sum of the water flow rates delivered by the pumps of the apparatus is substantially constant.

Said common driving fluid circulation loop preferably comprises a single pump and a single member for measuring the flow rate in said loop.

Said means for establishing selective communication comprise means that permanently prevent simultaneous closure of all of the circuits for delivering driving fluid to the actuators. Consequently, when a fraction of said selective communication means is closed so as to prevent driving fluid being delivered to one of said actuators, in order to cause the corresponding pump to perform a pause, at least a fraction of said selective communication means is open; given that the overall (aggregate) flow rate of driving fluid remains constant, the flow rate of driving fluid delivered to the other actuators fed by said loop is then increased, thereby causing an acceleration thereof and also of the corresponding pump(s).

Said means for selective communication essentially comprise valves that are electrically controlled by the electronic control unit which receives signals representing the positions of the pistons of the valves preferably together with a signal from a flow meter provided in said common loop. Alternatively, the flow meter measuring the overall flow rate of the driving fluid used by the pumping apparatus can be replaced by a flow meter placed on a duct for conveying the water delivered by the pumps to the membrane filter. It can also be replaced by a plurality (at least two) of flow meters placed on the ducts for conveying oil and connecting each actuator to the common loop. It can also be replaced by at least one sensor for sensing the travel speed of the shaft sliding in at least one of the pumps, assuming that the various pumps of the apparatus are provided with chambers, sliding shafts, and pistons of identical dimensions. Under such circumstances, in order to ensure that water is delivered at a total flow rate that is constant, it suffices to ensure that the sum of the velocities of the sliding shafts of the various pump is maintained permanently at a constant value.

In a preferred embodiment, each pump has a drive piston fixed in the middle of said sliding shaft; in this embodiment, each of said pumps has three pistons and a common sliding shaft for transmitting forces, each of the pistons being movable in reciprocating translation in a respective cylindrical chamber, the three chambers being in alignment on the longitudinal axis of the shaft which corresponds to the axis in which the pistons move in translation. Both identical end pistons serve firstly to compress the liquid for filtering and secondly to recover energy from the concentrate, and they are placed at respective opposite longitudinal ends of the shaft. The third or "drive" piston (of smaller diameter) is fixed on the shaft and is at equal distances from the two ends of the shaft. Thus, each of the two end chambers (referred to as "common" chambers) having a respective one of the two end pistons moving therein is subdivided into two portions or cavities separated by the piston and of volume that varies depending on the position of the piston. A first portion of each chamber has a portion of the shaft sliding in the middle thereof and is connected to the membrane filter to receive the concentrate (super-salinated water). A second portion of each chamber is connected to the ducts conveying the liquid for filtering (salt water). The central chamber in which the drive piston moves is connected to the feed and return ducts for driving hydraulic fluid, preferably constituted by oil.

The apparatus of the invention presents advantages:

- each of the end pistons which is in contact via a first one of its two faces (a "front" face) with the fluid to be filtered and which is in contact via a second one of its two faces (a "rear" face) with the concentrate leaving the filter is subjected to mechanical stresses that are small, given the small pressure difference that exists between these two liquids; in addition, this small pressure difference does not require the pistons to be fitted with sealing rings that are complex and expensive; and in any event a small amount of leakage through such a piston ring is easily tolerated; and

- unlike the apparatus described in U.S. Pat. No. 3,825,122, no portion of the shaft extends outside the chambers, thereby reducing the number of seals required and consequently reducing the risk of leakage; in addition that greatly simplifies machining and assembly of the fixed and moving parts by reducing the number of orifices (bearings) through which the shaft passes and that must be in accurate alignment; this also reduces friction forces on the shaft and on the pistons, and increases efficiency.

The structure of the apparatus also makes it possible to reduce the mechanical stresses applied to the shaft; this structure makes it possible to use elongate chambers, in particular chambers for which the ratio of length over diameter is greater than or equal to 3, more particularly lies close to the range 5 to 10, or 10 to 20. This elongate tubular shape makes it easier to make the chamber-defining bodies which must be capable of withstanding high pressures. This also contributes to obtaining a flow rate that is continuously variable or constant, thereby eliminating (and/or considerably diminishing) transient surges (at the ends of strokes), in particular by facilitating control over piston speed, and consequently over the speed of the common shafts.

These advantages are increased when at least one of the two end pistons is not rigidly connected to the corresponding end of the sliding shaft, in particular when the piston is connected to the shaft by connection means that allow the piston to move relative to the shaft about at least one axis. In particular, the connection can be constituted by a ball-and-socket joint or by a cardan joint, allowing relative rotation about at least one transverse axis (e.g. perpendicular to the longitudinal axis), by a bearing that allows relative translation along the longitudinal axis, or indeed by a combination of said connection means. When the piston is not connected to the shaft, both it and the end of the shaft present facing faces for coming into contact (bearing against) each other: while water for filtering is being delivered under high pressure, the shaft transmits the force exerted by the driving fluid on the central piston to said end piston via said face. While the end chamber is being filled by booster means (pump means) under low pressure, the end piston "follows" the end of the shaft while remaining in contact via said bearing face under drive from the (low) pressure exerted by the water for filtering acting against its first (front) face. Under such circumstances, the means for guiding sliding of the piston in the chamber are preferably integrated in the periphery of the end piston.

According to a characteristic of the invention, the ratio of the cross-section (relative to the common longitudinal axis of the chambers and of the shaft) of said first portion of the end chamber to the section of said second portion of the end chamber is proportional (equal) to the conversion ratio of the filter, which is generally about 20% to 75%. The diameters of the shaft and of the chambers of each of the pumps are selected so as to comply with this proportion.

The two end chambers are preferably identical and symmetrical about the central chamber receiving the drive piston and driven by the hydraulic fluid. The ducts connecting the pump to the filter are also substantially symmetrical.

In another aspect, a water filter installation comprises at least two pumps as defined above, with their inlets and outlets connected in parallel, with the operation of the pumps being maintained at a phase offset and with the velocity thereof being controlled and/or monitored to ensure that the accumulated total flow rate from the various pumps in terms of liquid (water) admitted via the inlet and of pressurized liquid (water) delivered via the outlet is substantially constant (preferably to within 10%, and in particular to within not more than 5%).

The invention preferably comprises two identical pumps whose shafts are driven at speeds and at a phase offset that vary during a cycle, with the phase difference being equal neither to zero nor to 180°, and with the sum of the absolute values of the velocities of the two shafts being substantially constant over time.

Given that the two water compression chambers of each pump operate in phase opposition by construction, adding a second pump in parallel with the first and having its shaft moving with a phase offset (relative to the movement of the shaft of the first pump) having a value that lies in the range 10° to 170°, for example, makes it possible to ensure that the flow rate of the fluid to be filtered never passes through zero as would otherwise happen in the presence of a single pump whenever the shaft (and the three pistons associated therewith) of the pump reaches the end of a stroke.

According to a characteristic of the invention, a first of the two shafts is accelerated while the second shaft is pausing at the end of a stroke (dead center point). In addition, the portion of the end chamber can be connected to a source of fluid under pressure so as to enable said fluid to pressurize the water sucked in by the piston (and/or delivered by an upstream booster pump) into said portion of the chamber, up to the normal feed pressure of the filter, thereby avoiding a (temporary) drop in the inlet pressure of the filter while this portion of the chamber is in communication with the inlet of the filter. This temporary pressurization is performed when the corresponding piston is at the end of a stroke (dead center position) after said portion has been filled. For this purpose, this chamber portion can be momentarily isolated from the suction and delivery circuits.

In a preferred embodiment, the supersalinated water (concentrate) is also used for cooling the driving hydraulic oil, by passing through a heat exchanger.

According to other preferred characteristics of the invention:

the tubular water pumping chambers are selected to have a diameter lying in the range 50 millimeters (mm) to 1000 mm, in particular in the range 100 mm to 600 mm;

the maximum velocity of the shaft and the pistons is maintained to lie in a range extending from 0.1 meters per second (m/s) to 10 m/s, and preferably in the range 0.25 m/s to 3 m/s;

the shafts and the pistons are caused to perform a pause at each end of the chambers ("top" and "bottom" dead center points), in particular in order to perform a step of pressurizing the water for a duration whose ratio relative to the shaft cycle period lies in the range 0.005 to 0.1, and in particular is approximately 0.01 to 0.05; and a hollow shaft is used to reduce the inertia of the moving equipment and to reduce friction on the bearings.

The advantages obtained by the invention will be better understood on reading the following description which refers to the accompanying drawings, which drawings show preferred embodiments of the invention without any limiting character.

In the drawings, elements that are identical or similar are given the same references from one figure to another, unless stated to the contrary.

The installation 1 is for desalinating water delivered to an inlet 2 by a booster pump (not shown) at a pressure lying in the range 3 bars to 4 bars. For this purpose, salt water is pressurized by each of two identical pumps 3, 4 to a pressure of 70 bars and it is delivered via ducts 5 to the inlet 6 of a reverse osmosis filter 7. The resulting fresh water is removed at 8 while the supersalinated water leaving the filter 7 at 9 at a pressure of 69 bars is taken back to the pumps 3, 4 by ducts 10. Inside the pump, the supersalinated water gives back its energy to the sea water which is about to be filtered, and is then removed at 11 under a pressure of 1 bar.

The extra energy required for pressurizing the sea water to be filtered up to 70 bars is supplied to each pump 3, 4 by a hydraulic unit 12 which delivers a flow of oil at substantially constant pressure and flow rate via an outlet 13. The oil is conveyed to the pumps by a duct 14 and returns to the hydraulic return of the unit via a duct 15.

Figure 1:
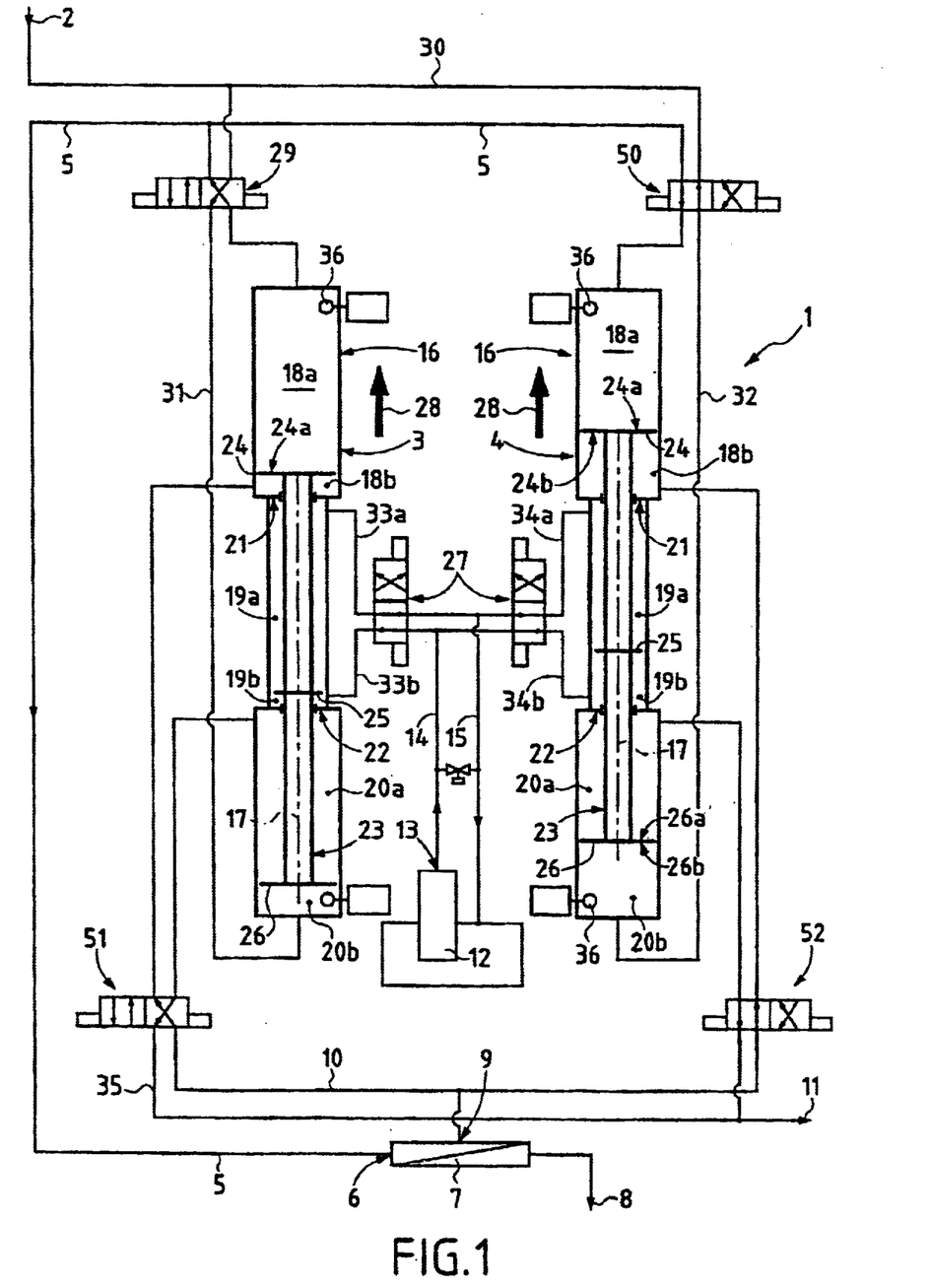
FIG. 1 is a diagram of an installation for desalinating sea water and comprising two identical pumps.

With reference to FIG. 1 in particular, each of the pumps 3, 4 comprises:

- a body 16 defining three cylindrical chambers 18*a* & 18*b*, 19*a* & 19*b*, and 20*a* & 20*b*; these three tubular chambers are in alignment along an axis 17 and they are separated from one another by two partitions 21, 22 each pierced by an orifice fitted with a bearing having sealing gaskets; and
- a hollow shaft 23 extending along the axis 17 and carrying three pistons 24, 25, 26; the shaft is mounted to slide in translation (along arrows 28) through the bearings fitted in the partitions 21, 22; the middle of the shaft 23 has a drive piston 25 suitable for sliding in the central chamber 19*a*, 19*b* under the effect of the pressure which is applied to one of its faces by the oil inserted into the portion (or cavity) 19*a* or on the contrary into the portion (or cavity) 19*b* depending on the desired travel direction, as a function of the position of a distributor valve 27 connecting said chamber to the ducts 14, 15; the piston 24 separates the portions 18*a* and 18*b* of a first end chamber while the piston 26 separates the portions (or cavities) 20*a* and 20*b* of the second end chamber; the geometrical configuration of the moving equipment is symmetrical about a transverse midplane, as is the configuration of the chambers in the body 16.

In the state shown in FIG. 1, movement of the piston 24 of each pump 3, 4 in the direction of arrow 28 causes the water for filtering that is present in the cavity 18*a* of each pump to be delivered at 70 bars into the ducts 5 leading to the filter 7 via respective distributor valves 29 and 50. Simultaneously, water for filtering fills the end cavity 20*b* of each pump, flowing along ducts 30, 31, 32. The energy required for compressing the water in the cavity 18*a* by means of the face 24*a* of the piston 24 is supplied in part by the concentrate penetrating into the cavity 18*b* as delivered by the duct 10 and respective distributor valves 51 and 52, the pressure of this concentrate acting on the second face 24*b* of the piston 24, and in part by the effect of thrust on the piston 25 delivered by the oil penetrating into the cavity 19*b* and coming from the unit 12, which force is transmitted to the piston 24 by the shaft 23.

The module and the direction and travel velocity of the two shafts are controlled by varying the positions (and/or states) of the respective distributors valves 27 associated with the two pumps 3, 4.

This regulation can be controlled electrically or hydraulically, by conventional means, not shown.

Figure 2:
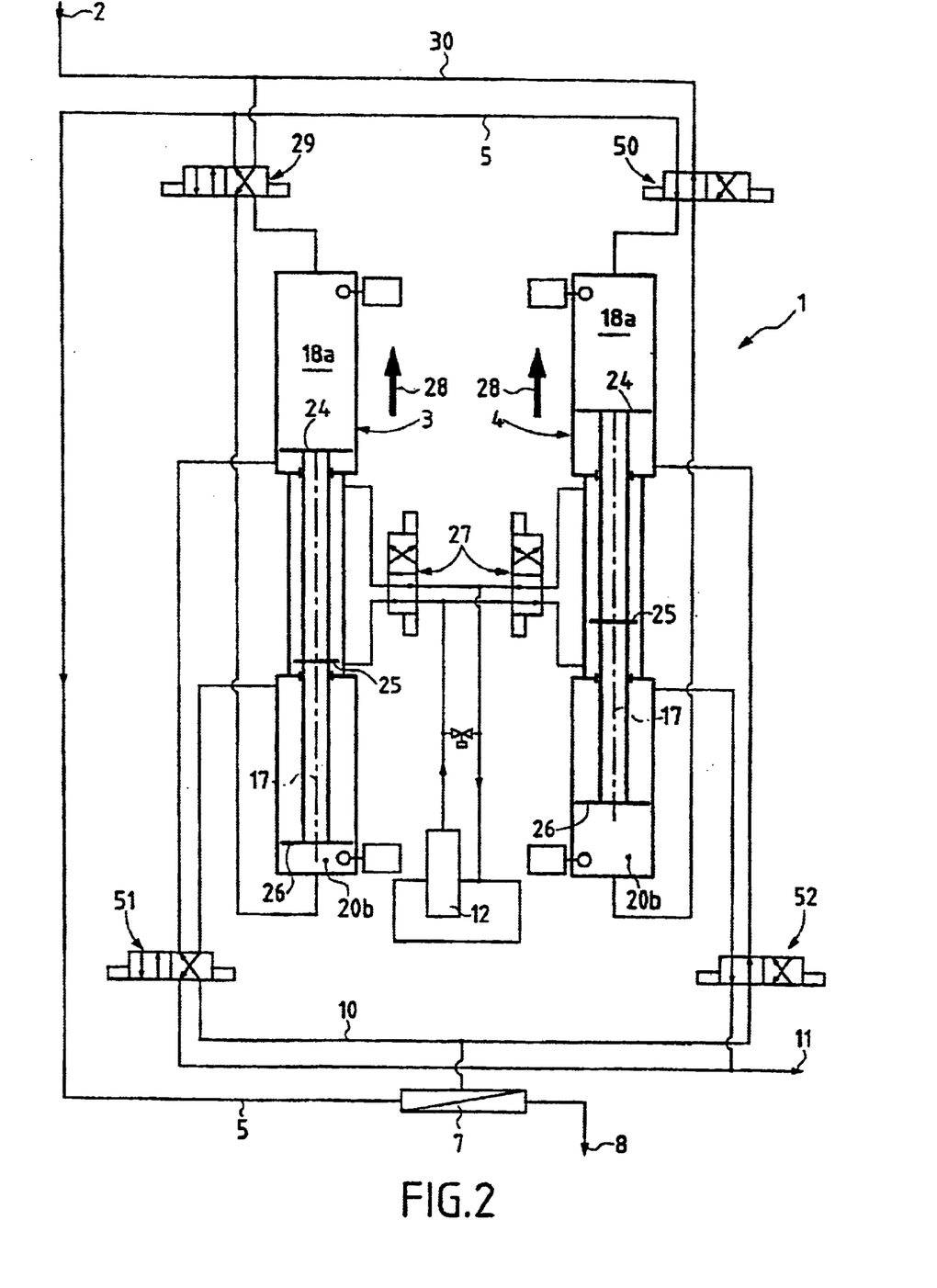
FIGS. 2 and 3 show the same installation in two different states of the pumping cycle.
Figure 4:
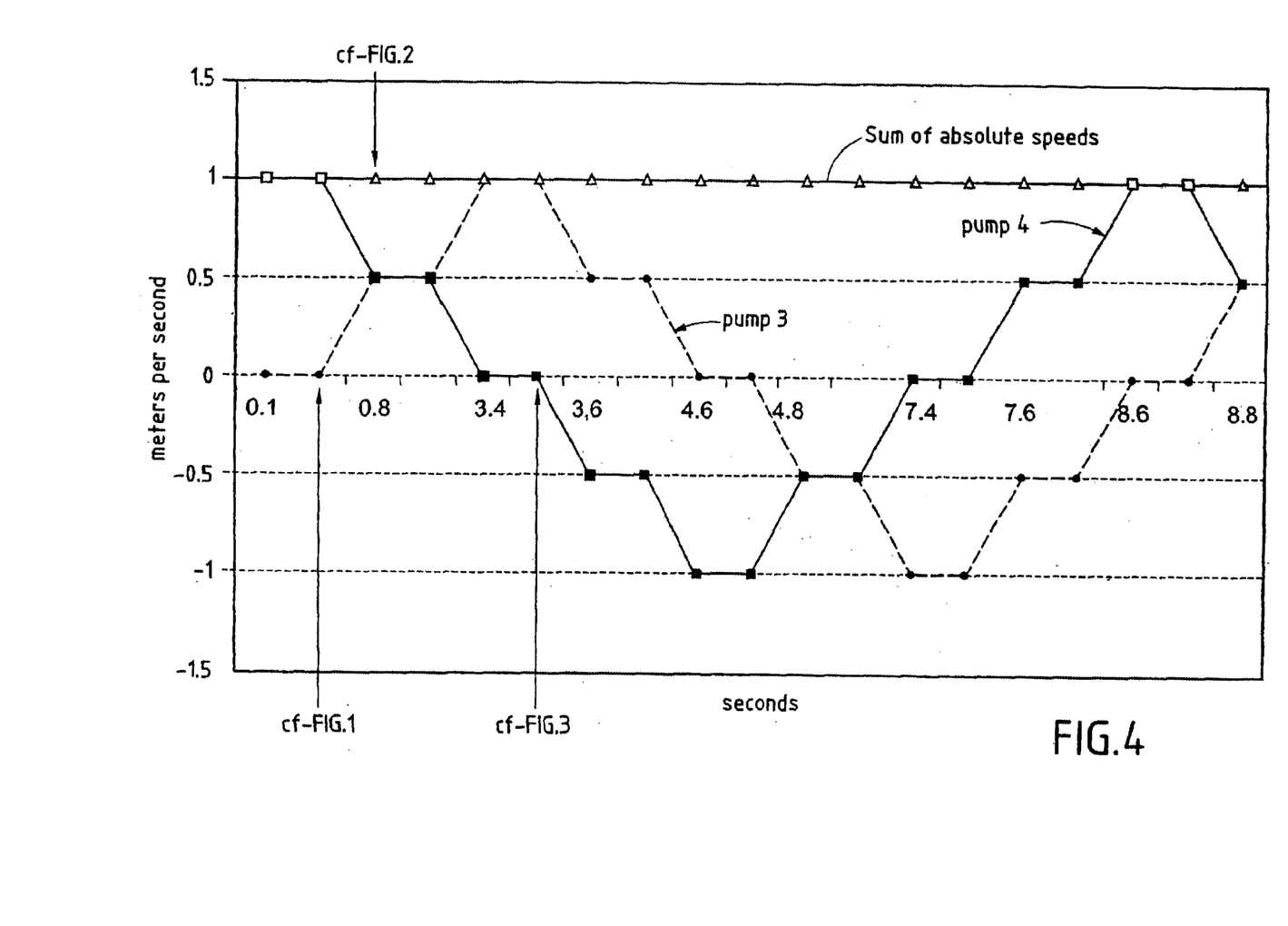
FIG. 4 is a histogram showing the velocity of the shaft in each of the pumps of FIGS. 1 to 3, showing how these velocities vary during a cycle.
Figure 5:
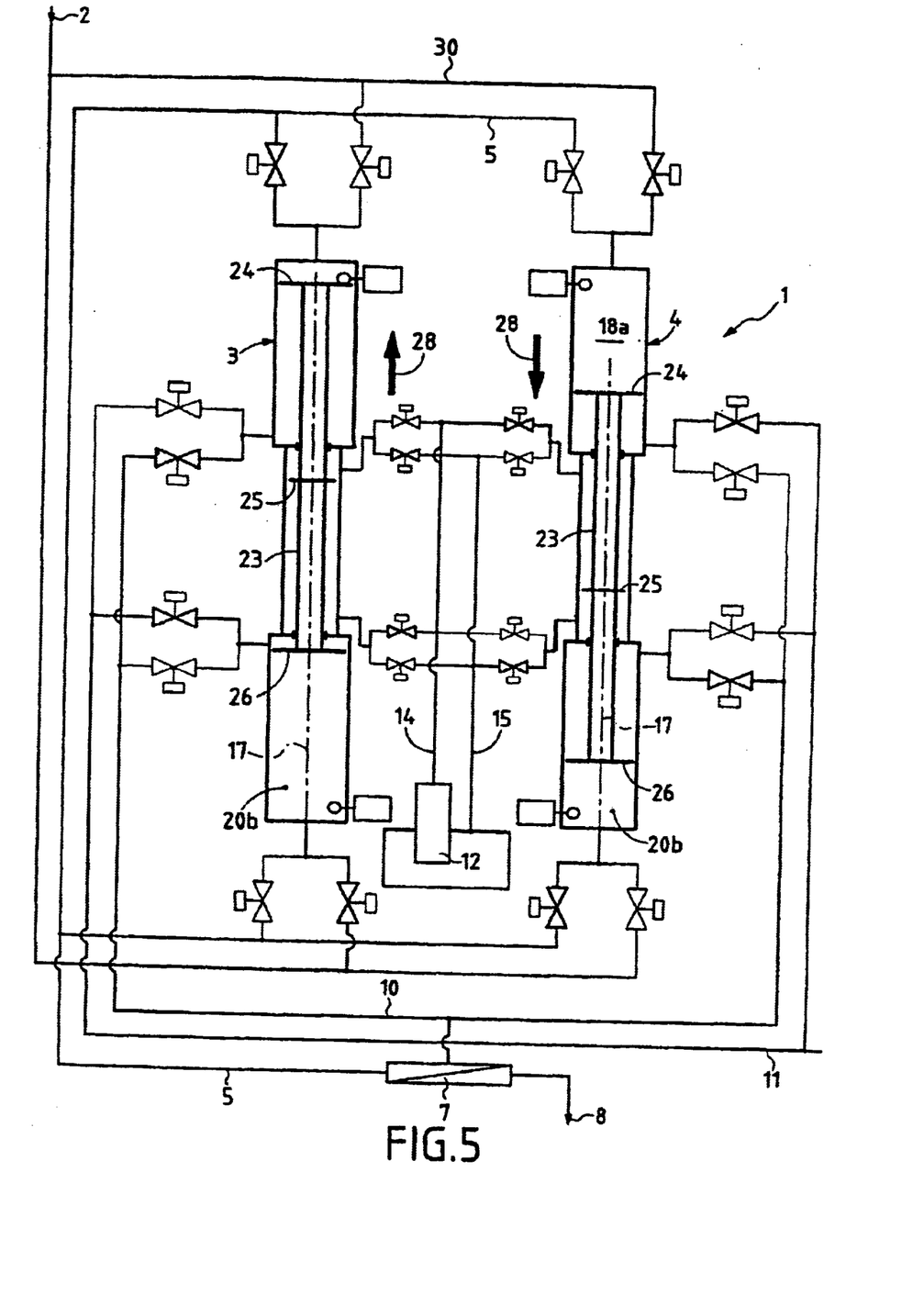
FIG. 5 is similar to FIGS. 1 to 3, showing a similar installation in which two-port solenoid valves are used to replace the distributor valves of FIGS. 1 to 3.

When the distributor valves 27 are in the position shown in FIG. 1, oil delivered into the duct 14 by the pump of the unit 12 is conveyed in part into the cavity 19*b* of the pump 3 via duct 33*b* and in part into the cavity 19*b* of the pump 4 via duct 34*b*. The flow rates of these two streams of oil travelling respectively along the two ducts 33*b* and 34*b* and which are functions of the positions of the distributor valve 27, are adjusted so as to cause the pump 3 to start (from its bottom dead-center point) and so as to ensure that the shaft of the pump 4 travels at a velocity of 1 m/s. As shown in FIGS. 2 and 4, the distributor valves are then controlled so as to increase the flow rate of oil along the duct 33*b* while simultaneously decreasing the flow rate of oil along the duct 34*b* until both flow rates are substantially in equilibrium (identical) so that they cause both shafts 23 to move identically at a velocity of 0.5 m/s (FIG. 2).

Figure 3:
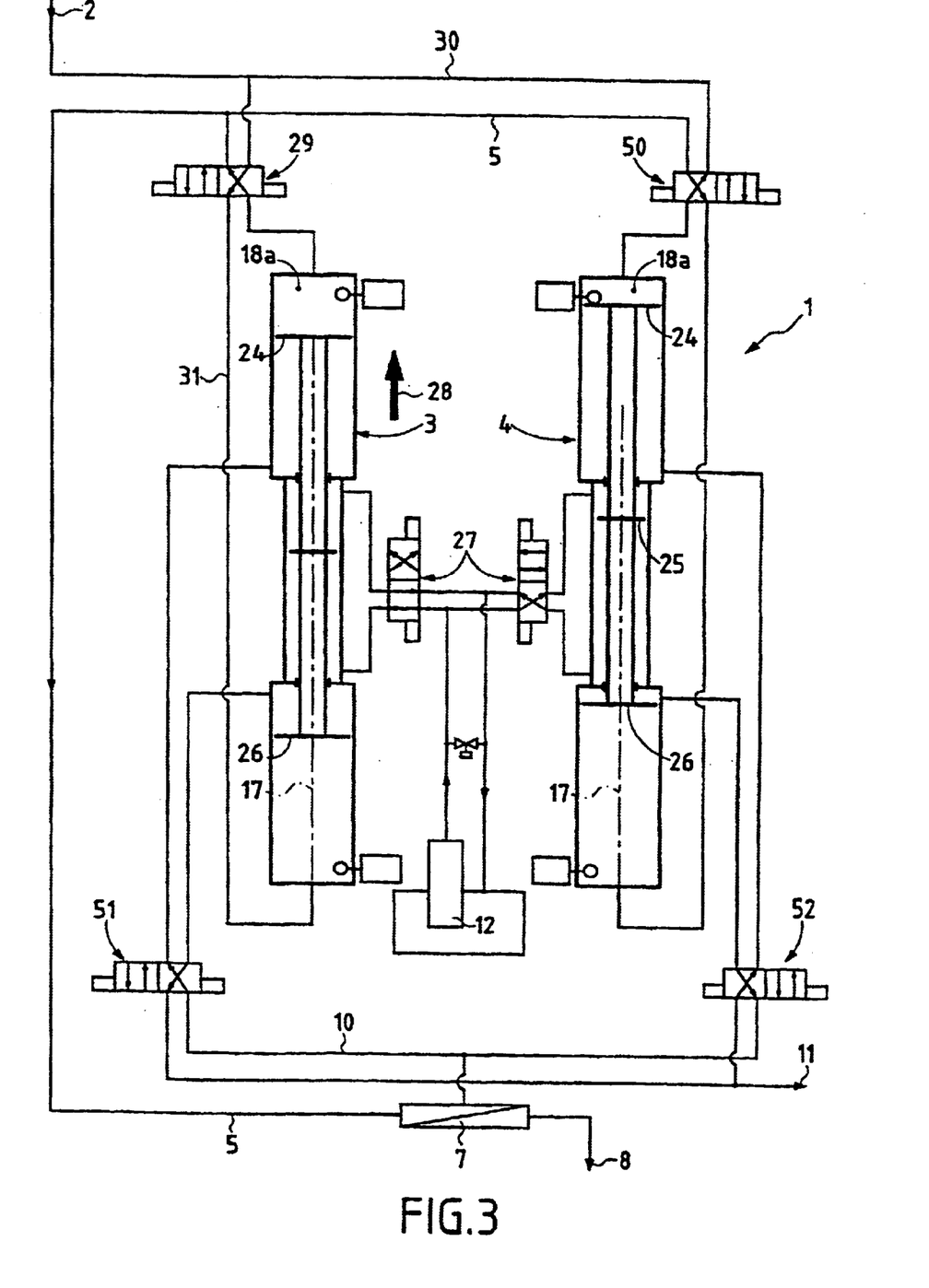

As shown in FIG. 4, the velocity of the shaft of each pump varies periodically in reciprocating manner (mean value zero) with portions at constant velocity. The mean velocity (in absolute value) of each pump shaft is 0.5 m/s, and the sum of the magnitudes of the velocities of the two shafts is maintained at a value of 1 m/s, thereby causing sea water to be admitted and pressurized sea water to be delivered at a constant flow rate. The three operating states shown in FIGS. 1 to 3 correspond respectively to points on the graphs of FIG. 4 having abscissa values of 0.7 seconds (s) (second points on the graphs); 0.8 s (third points on the graphs); and 3.5 s (sixth points on the graphs).

FIG. 4 shows a pause at zero velocity lasting for 0.1 s is performed at each dead point (stroke end). The graphs showing the velocities of the two pumps 3 and 4 are offset in phase by a value which varies during one period about a mean phase offset value of the order of 1.2 s, i.e. 54° given that the cycle period has a value of about 8 s.

Figure 7:
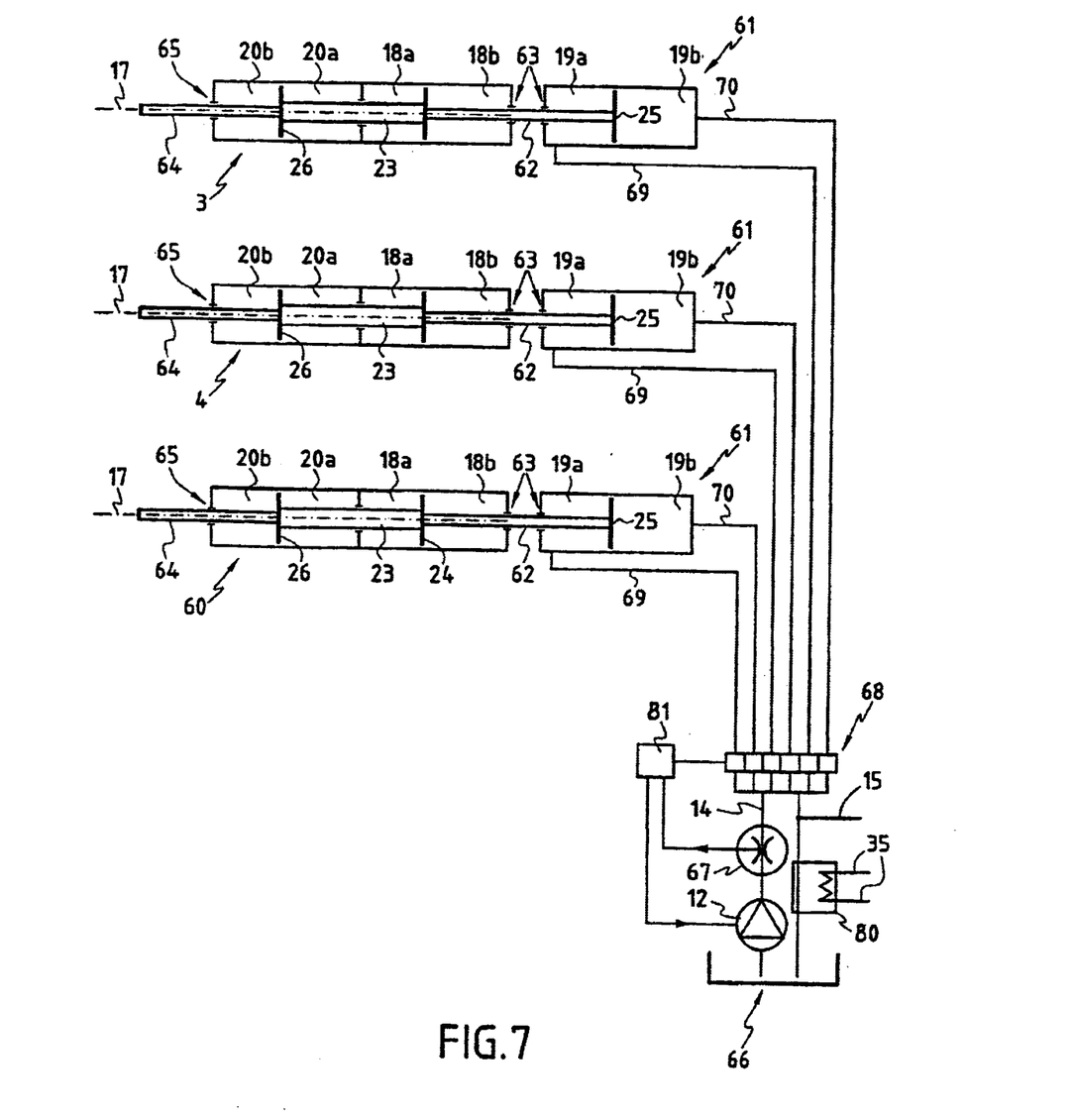
FIG. 7 is a fragmentary schematic of a variant embodiment of the invention in which the installation comprises three pumps connected in parallel.

A heat exchanger referenced 80 in FIG. 7 is preferably connected to the duct 35 for removing super-salinated water at low pressure and to one of the ducts 14, 15 for transporting oil so as to cool the oil.

A proximity sensor 36 responsive to the piston 24 (e.g. an electromagnetic sensor) is placed in the vicinity of the longitudinal end of each chamber 18*a*, 20*b* and is connected to a monitor unit referenced 81 in FIG. 7 for controlling the valves.

Figure 6:
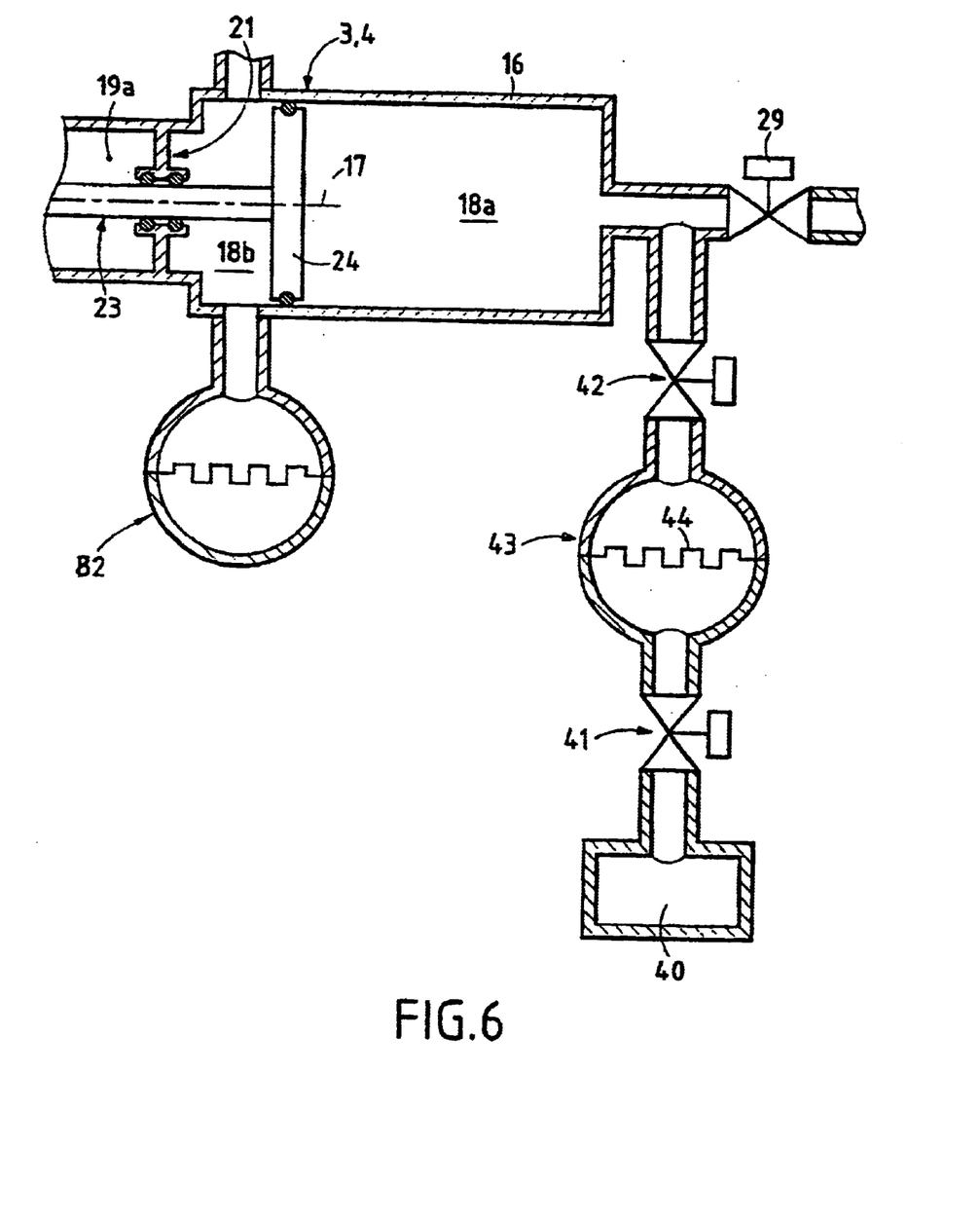
FIG. 6 is a diagram showing means for maintaining pressurization in the chambers of a pump.

During the pause, after the cavities 18*a*, 20*b* have filled with water for filtering, a pressurizing member is momentarily put into communication with the cavity so as to cause its pressure to go from 4 bars to 70 bars. As shown in FIG. 6, this can be performed by using an expansion chamber 43 (having a diaphragm 44) connected to the pump chamber and to a supply 40 of oil under pressure via ducts provided with controlled isolating members 41, 42 (solenoid valves). An accumulator 82 is connected to the recuperation cavity 18*b* which receives the super-salinated water, thus enabling pressure variations in said cavity to be damped.

The pumping installation shown in FIG. 7 has three identical pumps 3, 4, and 60 which are connected in parallel via their inlets and outlets to the water suction and delivery ducts (not shown) in the same manner as that described above.

Unlike FIGS. 1, 2, 3, and 5, the hydraulic actuator 61 for driving each pump is not disposed in the central portion of each pump but is separated from the body defining the cavities for sucking in and delivering water to be filtered (18*a*, 20*b*) and supersalinated water (18*b*, 20*a*).

Each actuator 61 comprises said drive piston 25 sliding in a cylindrical chamber 19*a*, 19*b* in alignment with the chambers of the water pumps 3, 4, or 60 associated with the actuator, said piston 25 being connected via a rod 62 to the sliding shaft 23 of the pump. The rod (or secondary shaft) 62 is mounted to slide relative to the body of the actuator 61 and the associated pump via leakproof bearings such as 63 provided through the walls of said bodies. In order to ensure that the ratios of the cross-sections of the cavities 20*a*, 20*b* is identical to that of the cross-sections of the cavities 18*b*, 18*a*, a rod 64 of section identical to that of the rod 62 is fixed to the piston 26 and is mounted to slide through an orifice pierced in the body of the pump via a leakproof bearing 65. The rods 62 and 64 are in alignment, as is the shaft 23 on the longitudinal axis 17 common to the pump and to the actuator, which axis is preferably horizontal so that the weight of the moving equipment (rods, pistons, and shaft) in each pump does not complicate controlling the movement thereof.

The loop 66 common to the three pumps for providing oil under pressure to drive the three actuators 61 includes a pump 12 delivering into a duct 14 fitted with a flow meter 67, and a duct 15 for returning oil to a return 68, with the cooler 80 being fitted to said duct.

Oil pressurized by the pump 12 is conveyed by the duct 14 to the inlet of a distributor valve 68 whose return outlet is connected to the duct 15.

The distributor valve 68 distributes the flow of oil as delivered by the pump 12 to the actuator 61 for actuating the pumps 3, 4, and 60 as described above, under the control of the control unit 81 which receives signals from the sensors 36 and 67.

For this purpose, each double-acting actuator 61 is connected to the distributor valve 68 via two ducts 69, 70.

What is claimed is:

1. Water pumping apparatus comprising
   first and second pumps (3, 4, 60), each of the pumps having two chambers (18a, 18b, 20a, 20b) in alignment and receiving respective pistons (24, 26) movable in translation within the cambers, the pistons being interconnected by a sliding shaft (23),
   double-acting, hydraulic actuators (19a, 19b, 25, 61) respectively for driving the pumps and a loop (14, 15) for circulating driving hydraulic fluid therefrom, the loop being common to the hydraulic actuators, and
   valve means (12, 27, 68, 81) for pausing the sliding shaft and pistons of the first of the pumps for a prolonged period at an end of a stroke thereof, accelerating the sliding shaft and pistons of the second of the pumps while the first of the pumps is paused, and selectively putting each of the actuators into communication with the loop in such a manner that the sum of absolute values of hydraulic fluid flow velocities to the actuators for the driving is substantially constant.

2. Water pumping apparatus comprising at least two pumps (3, 4, 60), each pump comprising:
   at least two chambers (18a, 18b, 20a, 20b) in alignment on a longitudinal axis (17);
   at least two pistons (24, 26) respectively mounted to move in reciprocating translation in each of the two chambers; and
   a transmission shaft (23) for transmitting forces between the two pistons, which shaft extends in part in each of the chambers and is mounted to slide relative thereto along said longitudinal axis;
   the pumping apparatus further comprising an actuator (19a, 19b, 25, 61) suitable for delivering the energy required for compressing the water, minus the energy recovered from the concentrate by said pistons, by causing the shaft (23) to move in reciprocating translation (sliding) together with the pistons in each of the pumps, and means (27, 68, 81) for causing the shaft and the pistons of each pump to pause for a prolonged period at the end of each stroke, and also means (27, 68, 81) for accelerating one of said two pumps while another one of said pumps is performing a prolonged end-of-stroke pause, and control means to maintain the total of flow velocities of water discharged by the pumps substantially constant.

3. Water pumping apparatus, characterized in that it comprises:
   two pumps (3, 4, 60) connected in parallel, each pump having two pistons (24, 26) mounted to move in translation in two aligned chambers (18a, 18b, 20a, 20b), and a sliding shaft (23) for transmitting forces between the pistons, in which a rear face (24b, 26b) of each of the two pistons (24, 26) co-operates with the pump body (16) and the shaft (23) to define a cavity (18b, 20a) receiving concentrate under pressure for contributing to pressurizing the water in a cavity (18a, 20b) defined by said body and the front face (24a, 26a) of the piston (24, 26);
   an actuator (19a, 19b, 25, 61) associated with each pump to drive it; and
   actuator control means (12, 27, 68, 81) for causing the shaft and the pistons of each pump to pause for a prolonged period at the end of each stroke and for accelerating one of said pumps while another one of said pumps is pausing for a prolonged period at the end of its stroke, thereby enabling a phase offset to be continuously maintained between the movements of the two pumps with the value of said offset being neither zero nor 180° and for maintaining all sums of absolute values of velocities of the slidings of the shafts (23) substantially constant.

4. Apparatus according to claim 1, further comprising means (40 to 44, 82) for pressurizing the water pumping chambers (18a, 18b, 20a, 20b) when the shaft and the pistons (17, 24, 26) operating in the water pumping chambers (18a, 18b, 20a, 20b) are motionless, and more particularly during the powering of the apparatus and/or when the said shaft and pistons (17, 24, 26) are at the end of each stroke.

5. Apparatus according to claim 1, further comprising control means (12, 27, 68, 81) for maintaining the sum of the absolute values of the velocities of the shafts (23) to a value which is substantially constant.

6. Apparatus according to claim 1, wherein the loop comprises a hydraulic unit common to the pumps.

7. Apparatus according to claim 1, in which the pistons (24, 26) are identical and are disposed at opposite ends of the shaft (23).

8. Apparatus according to claim 1, in which a third piston (25) is fixed to the shaft (23) at equal distances from the other two pistons (24, 26), which third in piston is slidable in a chamber (19a, 19b) for receiving a driving hydraulic fluid, and in which the moving equipment (23 to 26) and the chambers (18a to 20b) are disposed symmetrically about a transverse midplane.

9. Apparatus according to claim 1, in which the chambers (18a, 18b, 20a, 20b) are tubular and elongate, with the ratio of chamber length over diameter being greater than or equal to 3.

10. Apparatus according to claim 1, in which the neither of the two pistons (24, 26) is rigidly connected to the corresponding end of the shaft (23).

11. Apparatus according to claim 1, in which both pistons (24, 26) are connected to the corresponding shaft end (23) via means comprising a ball-and-socket joint, a cardan joint, or a sliding bearing.

12. A method of desalinating sea water by reverse osmosis, in which apparatus according to claim 1 is used and in which the maximum velocity of the shafts and pistons is maintained a value lying in the range 0.1 m/s to 10 m/s.

13. A method of desalinating sea water by reverse osmosis, in which apparatus according to claim 1 is used, and in which a phase offset is maintained between two pumps (3, 4, 60) at a value lying in the range 10° to 17°.

14. A method of desalinating sea water by reverse osmosis, in which apparatus according to claim 1 is used, and in which each pump is caused to move periodically with a period of duration lying in a range 1 second to 100 seconds.

15. A method according to claim 14, in which a pause is caused at the end of the stroke of each of said pistons (24, 26) for a duration whose ratio compared with the said period has a value lying in the range $10^{-3}$ to $10^{-1}$.

16. Apparatus according to claim 2, further comprising means (40 to 44, 82) for pressurizing the water pumping chambers (18*a*, 18*b*, 20*a*, 20*b*).

17. Apparatus according to claim 2, further comprising control means (12, 27, 68, 81) for maintaining the sum of the absolute values of the velocities of the shafts (23) to a value which is substantially constant.

18. Apparatus according to claim 2, further comprising a hydraulic unit (12) common to the pumps (3, 4, 60).

19. Apparatus according to claim 2, in which the pistons (24, 26) are identical and are disposed at opposite ends of the shaft (23).

20. Apparatus according to claim 2, in which a third piston (25) is fixed to the shaft (23) at equal distances from the other two pistons (24, 26), which third piston is slidable in a chamber (19*a*, 19*b*) for receiving a driving hydraulic fluid, and in which the moving equipment (23 to 26) and the chambers (18*a* to 20*b*) are disposed symmetrically about a transverse midplane.

21. Apparatus according to claim 2, in which the chambers (18*a*, 18*b*, 20*a*, 20*b*) are tubular and elongate, with the ratio of chamber length over diameter being greater than or equal to 3.

22. Apparatus according to claim 2, in which the neither of the two pistons (24, 26) is rigidly connected to the corresponding end of the shaft (23).

23. Apparatus according to claim 2, in which both pistons (24, 26) are connected to the corresponding shaft end (23) via means comprising a ball-and-socket joint, a cardan joint, or a sliding bearing.

24. Apparatus according to claim 1, further comprising means (80) for cooling the hydraulic fluid with water.

25. Apparatus according to claim 2, further comprising means (80) for cooling the hydraulic fluid with water.

* * * * *